Dec. 23, 1941.  G. BRAHS  2,267,013
LOOM PICKER
Filed Dec. 14, 1940
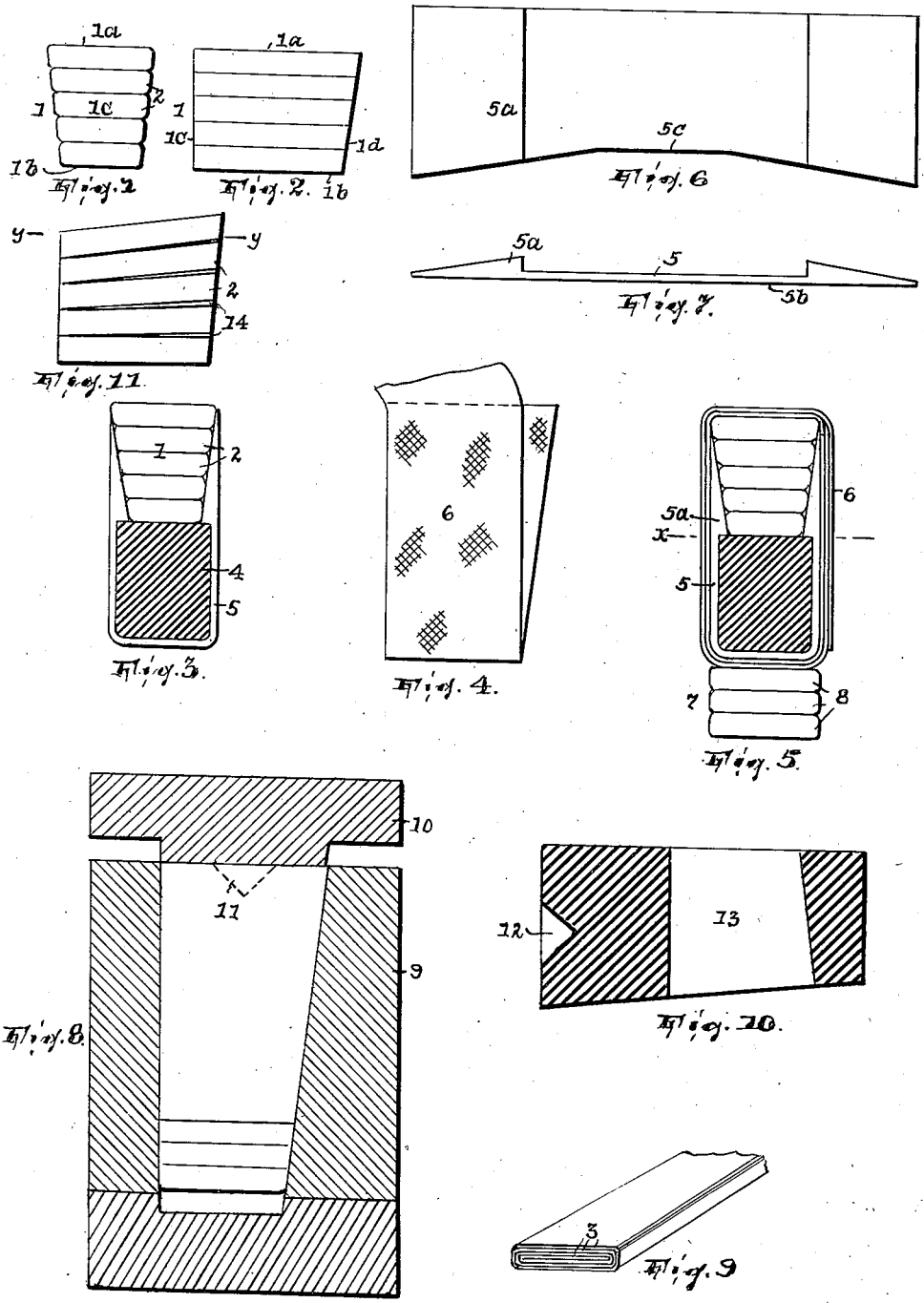
INVENTOR.
George Brahs,
BY John W. Seward
ATTORNEY.

Patented Dec. 23, 1941

2,267,013

UNITED STATES PATENT OFFICE 2,267,013

LOOM PICKER

George Brahs, Hawthorne, N. J.

Application December 14, 1940, Serial No. 370,192

5 Claims. (Cl. 139—159)

This invention relates to pickers for looms and it consists in a picker formed of reinforced rubber or equivalent resilient material and so constructed as to have much greater durability in general than ordinary pickers of its class and in particular to be considerably stronger where such ordinary pickers usually part or break, that is to say, where, at each side of the picker-stick hole, the structure is thinnest and where, in particular, distortion and other strains manifest their disrupting effect most—where the said portions adjoin the block or head of the picker which strikes the shuttle.

In the drawing:

Figs. 1 and 2 are top plan and side elevations, respectively, of the contained block;

Fig. 3 is a top plan of the block and yoke, with the core shown in section;

Fig. 4 shows the assembly comprising the parts appearing in Fig. 3 and the wrapper as viewed from the right in that figure;

Fig. 5 is a plan of said assembly and an external block associated therewith;

Figs. 6 and 7 show in plan and side elevation, respectively, the blank from which the yoke is formed;

Fig. 8 is a sectional view of the curing mold before its cover has been depressed to force the assembly of parts shown by Fig. 5 into the body of the mold;

Fig. 9 is an isometric view of the strip from which one of the layers of either block is formed;

Fig. 10 is a longitudinal sectional view of a picker formed in accordance with my invention and including the block shown in Fig. 11; and Fig. 11 shows said block in side elevation and in its initial state.

1 designates the contained block. Its front, rear, top and bottom faces are indicated at $1a$, $1b$, $1c$ and $1d$, respectively, in Figs. 1 and 2. Essentially, it comprises layers 2 each of which itself comprises layers 3 (Fig. 9) of rubberized fabric. Because the layers 2 are graduated in width the block tapers from front to rear. The component layers 3 of each layer 2 are here and preferably developed by forming rubberized fabric into a flat long coil or coiled strip (Fig. 9). Several of such coils, graduated in width, being formed, they are stacked so as to form a stick tapering in cross-section, whereupon the stick is divided to produce the blocks. The dividing is done so that the top face $1c$ of the block will be perpendicular to its front and rear faces and its bottom face $1d$ will be in somewhat obtuse relation to its rear face. Since the rubber of the fabric is as yet uncured each layer adheres to its neighbor.

Having thus formed the contained block 1 it is placed with its face $1b$ against a metal core 4 whose top and bottom faces are preferably flush with the corresponding faces of the block so that they together may be entered into the mold.

Then the yoke 5 is applied to the assembly formed by the block and core. Initially this exists as a strip of resilient plastic, as natural or synthetic rubber; it may contain fibrous material, but it should have greater resilience than the wrapper component (to be referred to) of the finished picker. Such strip has its end portions $5a$ thicker than the intermediate portion and reversely wedge-shaped in side elevation as shown in Fig. 7, preferably so that one face $5b$ of the strip may conform throughout to a plane. The yoke is so applied, as in Fig. 3, as to be bent around the core, with its plain side outward, leaving its said end portions flanking the block at its converging sides. So that the bottom margin of the yoke may be flush all around with bottom surface of said assembly the strip is initially cut away, as at $5c$, at one long side thereof.

The assembly so far formed by the block, core and yoke is then encased in a wrapper 6, which is a band of rubberized fabric. It embraces the outer face of the yoke and the front face $1a$ of the block and forms a generally oblong coil. Its width is equal to the minimum width of the yoke-forming strip and in winding it around said assembly, as shown in Fig. 5, it is alternately skewed up and down (Fig. 4) where it passes around the front face of the block so as to cover said face as well as the faces of the yoke.

Finally an external block or buffer 7 composed of rubber, here shown in layers 8, is arranged in adhering relation to the intermediate portion of the yoke, or at what will be the rear of the finished picker. It may be somewhat narrower than the assembly formed by the parts 1, 4, 5 and 6, but its top and bottom faces are flush with the corresponding faces of the assembly they form.

The then-resulting assembly is introduced into the body 9 of a curing mold, whereupon the mold cover 10 is depressed to force the assembly fully into the mold body and thereby compress it and heat applied to cure the rubber ingredient of the assembly. The cover preferably has a protuberance 11 which serves to form the recess 12 in the front face of the picker to receive the shuttle point. In the curing the rubber of the various parts develops into a state so integral that only the fabric layers of the block 1 appear at the top and bottom of the picker, and even these only indistinctly. In the finished picker a hole 13 is left to receive the picker-stick when the core is removed.

At any rate there is a rubber and hence resilient layer (here formed by so much of the yoke as flanks the hole and the block 1) along each side of the picker and embraced by the wrapper, such being a factor, because it has greater resilience than the wrapper, in deferring breaking or parting of the picker at the usual place, to wit, at or rather forward of the line $x$ in Fig. 5. And if the portion of each such layer which immediately flanks the block 1 is thickened as stated parting of the picker at either of the points indicated is of course still further deferred. This thickening is tapered so as on the one hand to have the thickness greatest where the picker is weakest and on the other to have it least where the block should have (at its front portion) maximum width.

Between the layers 2 of the block 1 are inserted (Fig. 11) filling layers 14, preferably of rubberized fabric, so that the lengthwise thickness at the bottom of the block will be greater than the corresponding thickness at the top, whereupon the picker is compressed so that the front face is displaced from the plane $y$—$y$ in Fig. 11 into parallelism with the rear face. The core, yoke and wrapper are then assembled with the block as before whereupon, before the curing, said core is removed and a tapering metal core forced into the hole to develop the latter to the tapered form shown in Fig. 10. The operation of initially shaping the block as thus described and then compressing it has the advantage that the forward portion of the picker is condensed and so improved in durability; the state of compression existing gradually decreases in degree upwardly from the bottom face or base of the picker, being thus at the maximum where the wear and tear on this part of the picker is greatest. Fig. 10 shows the hole 13 having a tapered form to fit the taper usually existing on the picker-stick; the forward portion of the picker being already condensed, as explained, the hole may be given a tapered form in any way, as by forcing the picker on the tapered portion of the picker-stick.

Having thus fully described my invention, what I claim is:

1. A unitary loom picker including a generally oblong resilient coil, a block contained in the coil and extending short of one short side thereof to afford the picker-stick hole and formed generally of less width than the hole from one to the other long side of the coil and spaced from both such long sides, and cushioning layers having greater resilience than the coil and respectively filling the spaces between the block and said long sides of the coil.

2. A unitary loom picker including a generally oblong resilient coil, a block contained in the coil and having its side adjacent to one short side of the coil spaced therefrom to afford the picker-stick hole and its sides adjacent to the long sides of the coil converging toward said short side and spaced from the long sides of the coil, and cushioning layers having greater resilience than the coil and respectively filling the spaces between the block and said long sides of the coil.

3. A loom picker comprising a block of resilient material tapering as viewing the picker in plan, a wrapper of rubberized fabric embracing the block so as to flank its converging sides and forming with the side toward which they converge a picker-stick hole, and cushioning layers having greater resilience than the wrapper respectively flanking said converging sides of the block and also flanking the hole at opposite sides of the picker and lying between the wrapper and the block, said layers having their portions flanking the block tapering reversely to the taper of the block, and the whole forming a cured mass.

4. The loom picker set forth in claim 3 characterized by said layers forming the terminals of a yoke existing as a strip whose portion between said terminals flank the rear side of the picker stick hole and is there interposed between the hole and the wrapper.

5. A loom picker comprising a block of resilient material tapering as viewing the picker in plan, a wrapper of rubberized fabric embracing the block so as to flank its converging sides and forming with the side toward which they converge a picker-stick hole, and cushioning layers having greater resilience than the wrapper respectively flanking said converging sides of the block and lying between the wrapper and the block, said layers tapering reversely to the taper of the block, and the whole forming a cured mass.

GEORGE BRAHS.